US005499543A

United States Patent [19]

Nissen et al.

[11] Patent Number: 5,499,543
[45] Date of Patent: Mar. 19, 1996

[54] DEVICE FOR MEASURING THE FLOW OF FLUID THROUGH A MEASURING PIPE

[75] Inventors: Peter Nissen, Rosdorf; Klaus Schäfer, Hann Münden, both of Germany

[73] Assignee: Fischer & Porter GmbH, Goettingen, Germany

[21] Appl. No.: 297,043

[22] Filed: Aug. 29, 1994

[30] Foreign Application Priority Data

Sep. 7, 1993 [DE] Germany .......................... 42 30 290.4

[51] Int. Cl.$^6$ .................................................... G01F 1/58
[52] U.S. Cl. ..................................... 73/861.16; 73/861.17
[58] Field of Search ........................ 73/861.12, 861.11, 73/861.08, 861.16, 861.17

[56] References Cited

U.S. PATENT DOCUMENTS

| | | | |
|---|---|---|---|
| 3,981,190 | 9/1976 | Vidmantas | 73/194 EM |
| 4,470,309 | 9/1984 | Wada | 73/861.12 |
| 4,658,653 | 4/1987 | Tomita | 73/861.12 |
| 5,018,391 | 5/1991 | Doll | 73/861.17 |
| 5,301,556 | 4/1994 | Nissen et al. | 73/861.15 |
| 5,375,475 | 12/1994 | Kiene et al. | 73/861.15 |

FOREIGN PATENT DOCUMENTS

| | | |
|---|---|---|
| 9103046.3 | 7/1991 | Denmark . |
| 547751 | 6/1993 | Germany . |

OTHER PUBLICATIONS

Noriichi et al; "Electromagnetic Flow Meter"; *Patent Abstracts of Japan, vol. 9, No. 170, p. 373, Jul. 16, 1985.*
Translation of § "Technische Strömungslehre" 4.4.3 of by Willi Bohl, 9th edition, 1991; published Dec. 16, 1985.

*Primary Examiner*—Richard Chilcot
*Assistant Examiner*—Jewel V. Artis
*Attorney, Agent, or Firm*—Foley & Lardner

[57] ABSTRACT

A device for measuring the flow of a fluid through a measuring pipe, includes a first coil arranged above the measuring pipe, a second coil arranged below the measuring pipe, and a pair of electrodes facing one another, on the sides of said measuring pipe. The coils are excitable and produce both aiding and opposing magnetic fields. A correction circuit corrects the voltage ($U_r$) between the electrodes. The corrected voltage is approximately proportional to the fluid flow in the presence of aiding magnetic fields when the measuring pipe is partially filled. The correction circuit provides correction to an output signal (S) corresponding to the flow of the fluid when the measuring pipe is partially filled by means of a correction function to a corrected voltage ($U_t$) which depends on the voltages ($U_r$, $U_g$) between the electrodes in the presence of aiding and opposing magnetic fields. The correction function is accomplished by employing a detecting electrode which is arranged at the top of the measuring pipe for detecting complete filling of the measuring pipe. The potential generated by the detecting electrode controls a circuit such that when the measuring pipe is completely filled, the circuit generates voltage ($U_r$) corresponding to the aiding magnetic fields as an output signal (S), and when the measuring pipe is partly filled, the circuit generate the corrected voltage ($U_t$) as an output signal (S).

4 Claims, 3 Drawing Sheets

DEVICE FOR MEASURING THE FLOW OF FLUID THROUGH A MEASURING PIPE

BACKGROUND OF THE INVENTION

The present invention pertains to a device for measuring the flow of a fluid through a measuring pipe. The device includes a coil arranged above the measuring pipe, a coil arranged below the measuring pipe, and a pair of electrodes facing one another on both sides of said measuring pipe, wherein the coils are excitable for producing both aiding and opposing magnetic fields. A correction circuit is provided which corrects the voltage between the electrodes. The circuited voltage is only approximately proportional to an output signal corresponding to the flow of the fluid in the presence of aiding magnetic fields when the measuring pipe is partially filled and a correction circuit is provided which corrects the voltage. The corrected voltage is dependent upon the voltages measured between the electrodes in the presence of both aiding and opposing magnetic fields.

Devices of this type are known. However, the devices of the prior art only provide useful measured values when the measuring pipe is only partly filled.

In case of irregularities of the flow profile of the fluid flowing through the measuring pipe, however, the known devices do not distinguish reliably between complete and partial filling and consequently measuring errors can occur.

SUMMARY OF THE INVENTION

In order to avoid such measuring errors the device of the present invention is characterized in that an electrode is provided at the top of the measuring pipe for detecting complete filling of the measuring pipe. By means of the potential generated by this electrode, circuit means are controlled. When the measuring pipe is completely filled, the circuit means generate the voltage corresponding to the aiding magnetic fields as an output signal. However, when the measuring pipe is only partly filled, the circuit means instead generate the corrected voltage as the output signal.

BRIEF DESCRIPTION OF THE DRAWINGS

The invention will be explained below on the basis of an embodiment with reference to the enclosed drawings.

DETAILED DESCRIPTION OF THE PREFERRED EMBODIMENT

Figure 1:
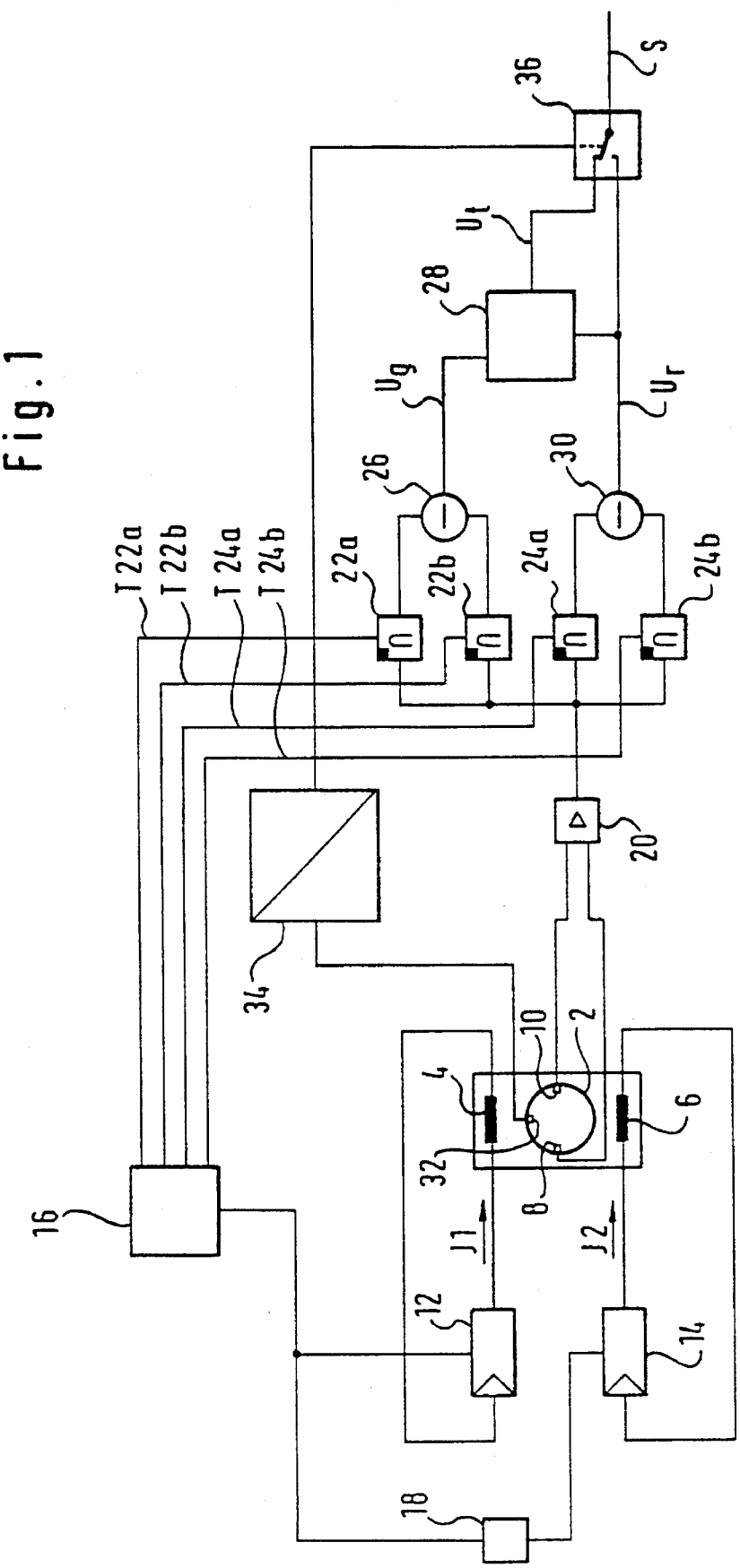
FIG. 1 is a schematic view of a device of the present invention including the circuit thereof.
Figure 2:
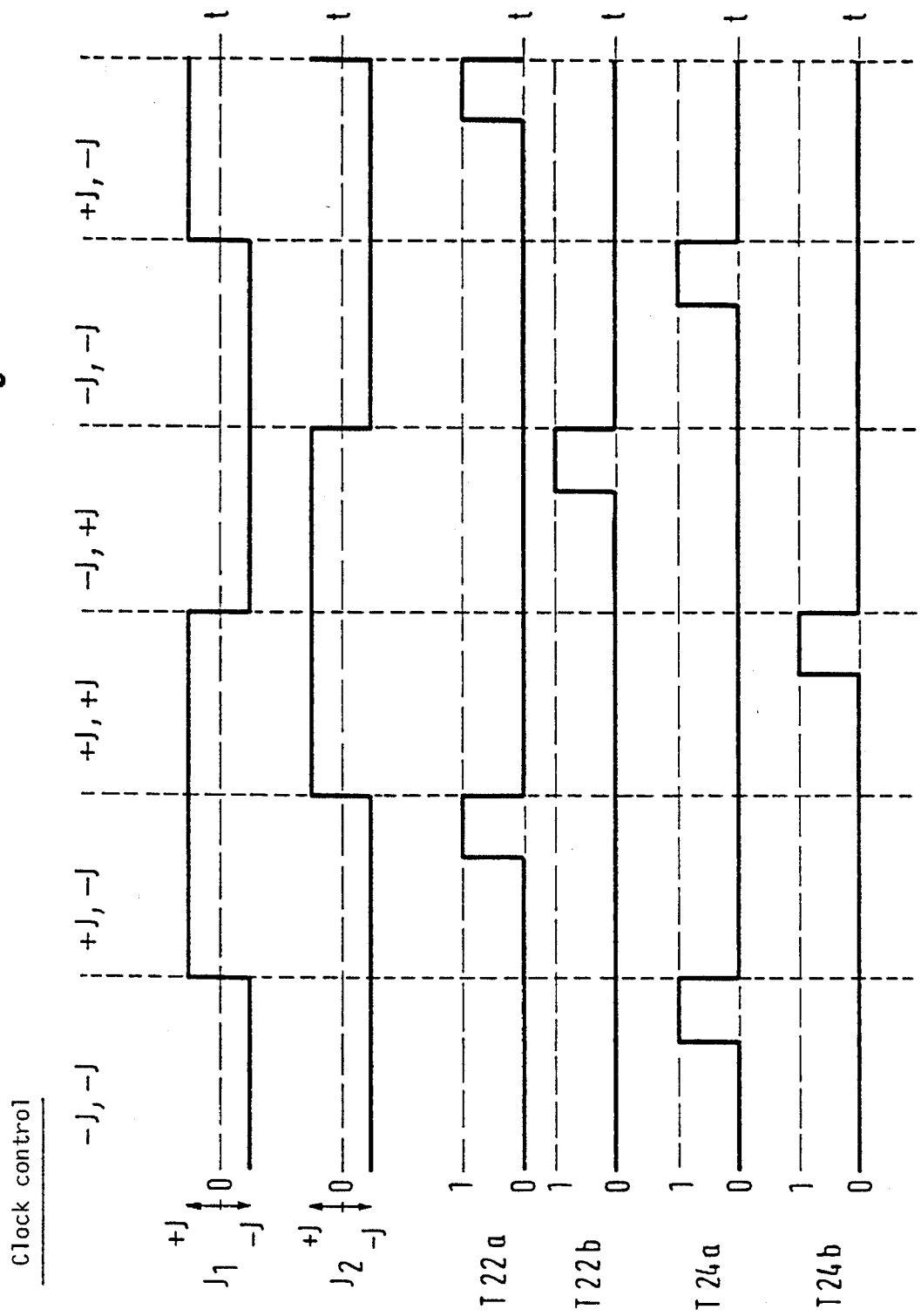
FIG. 2 is a view of current and signal characteristics in the device according to FIG. 1.

The device according to the embodiment comprises a measuring pipe 2, a coil 4 above the measuring pipe 2 and a coil 6 below the measuring pipe, as well as a pair of electrodes 8, 10 facing one another on the sides of the measuring pipe 2.

The coils 4, 6 are excitable by drivers 12, 14 for producing both aiding and opposing magnetic fields. These drivers 12, 14 generate 90° phase-shifted square-wave currents and are controlled accordingly by a clock generator 16 and a phase shifter 18.

The voltage between the electrodes 8, 10 is supplied to the inputs of a differential amplifier 20 whose output is connected to inputs of holding members 22a, 22b, 24a, 24b. The holding members 22a, 22b, 24a, 24b are associated with the four different states of the 90° phase-shifted square-wave currents supplied to the coils 4, 6.

The holding members 22a, 22b, 24a, 24b are also controlled by the clock generator 16.

The outputs of the holding members 22a, 22b are connected through a subtraction member 24 to an input of a correction unit 28. The outputs of the holding members 24a, 24b are connected through a subtraction member 30 to another input of the correction unit 28.

Figure 3:
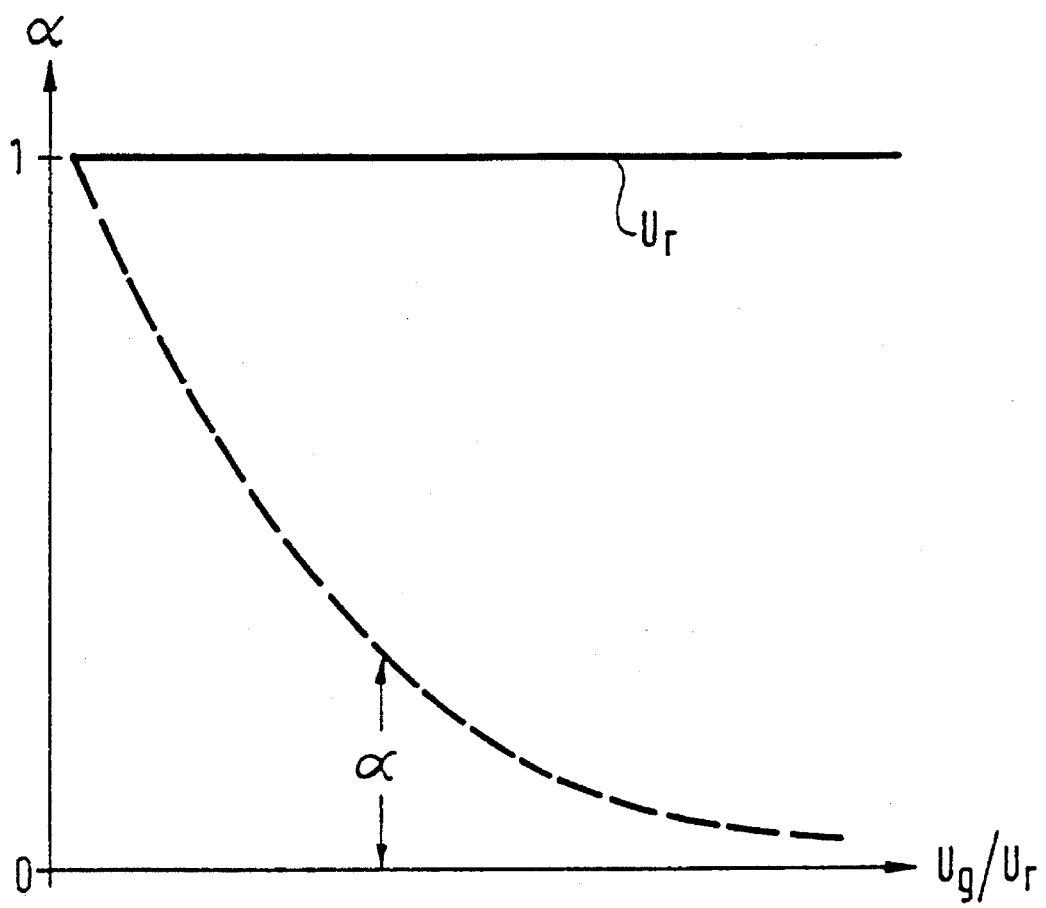
FIG. 3 is a correction curve.

The subtraction member 26 supplies a voltage $U_g$ to the correction unit 28. The subtraction member 30 supplies a voltage $U_r$ to the correction unit 28. The correction unit 28 derives from these voltages $U_g$ and $U_r$ by quotient formation of $U_g$ and $U_r$, inter alia, a correction factor α which can be seen from FIG. 3, which supplies a voltage $U_f=U_r \cdot α$ is proportionate to the current through the measuring pipe 2 when the measuring pipe 2 is partly filled. The voltage $U_r$ is proportionate to this flow when the measuring pipe 2 is completely filled.

At the top of the measuring pipe 2 an electrode is provided for detecting complete filling of a measuring pipe. By the potential of this electrode, circuit means 34, 36 are controlled which when the measuring pipe 2 is completely filled, generate a voltage $U_r$, corresponding to the aiding magnetic fields as an output signal. In addition when the measuring pipe 2 is partly filled, the circuit means 34, 36 generate the voltage $U_f$ as an output signal S.

We claim:

1. A device for measuring the flow of a fluid through a measuring pipe, comprising a first coil arranged above said measuring pipe, a second coil arranged below said measuring pipe, first and second electrodes facing one another, on the sides of said measuring pipe, wherein the first and second coils are excitable and produce both aiding and opposing magnetic fields, a correction circuit for correcting the voltage ($U_r$) between said first and second electrodes which is approximately proportional to the fluid flow in the presence of aiding magnetic fields when said measuring pipe is partially filled, said correction circuit providing correction to an output signal corresponding to the flow of the fluid when the measuring pipe is partly filled by means of a correction function to a corrected voltage ($U_f$) depending on the voltages between the first and second electrodes in the presence of aiding and opposing magnetic fields, a third electrode arranged at the top of said measuring pipe for detecting complete filling of said measuring pipe, and circuit means responsive to the potential of said third electrode such that when the measuring pipe is completely filled, said circuit means generates a voltage ($U_r$) corresponding to the aiding magnetic fields as an output signal, and when the measuring pipe is partly filled, said circuit means generates the corrected voltage ($U_f$) as an output signal.

2. A device according to claim 1, further comprising:

a clock generator for generating a first pulse, a second pulse 90 degrees out of phase with respect to the first pulse, a third pulse 90 degrees out of phase with respect to the second pulse, and a fourth pulse 90 degrees out of phase with respect to the third pulse, each of said first through fourth pulses being output at a predetermined frequency, wherein a difference voltage Ug between the first and second electrodes is determined by subtracting the voltage between the first and second electrodes at a time corresponding to the second pulse from the voltage between the first and second electrodes at a time corresponding to the fourth pulse, and the voltage Ur is determined by subtracting the voltage between the first and second electrodes at a time corresponding to the first pulse from the voltage between the first and second electrodes at a time corresponding to the third pulse.

3. A device according to claim 2, wherein said circuit means determines a ratio Ug/Ur, said ratio Ug/Ur being used to determine a correction factor which is multiplied with said voltage Ur when said third electrode does not detect complete filling of said measuring pipe.

4. A device according to claim 2, wherein the corrected voltage Ut equals the voltage Ur when the measuring pipe is completely filled, and the corrected voltage Ut equals the voltage Ur multiplied by the correction factor when the measuring pipe is partly filled.

* * * * *

UNITED STATES PATENT AND TRADEMARK OFFICE
CERTIFICATE OF CORRECTION

PATENT NO.  : 5,499,543
DATED       : March 19, 1996
INVENTOR(S) : NISSEN et al.

It is certified that error appears in the above-indentified patent and that said Letters Patent is hereby corrected as shown below:

On the Title page, item [30] Foreign Application Priority Data "42 30 290.4" should read --P 43 30 290.4--.

Signed and Sealed this

Eleventh Day of June, 1996

Attest:

BRUCE LEHMAN

*Attesting Officer*     Commissioner of Patents and Trademarks